US012175622B1

United States Patent
Kothari et al.

(10) Patent No.: US 12,175,622 B1
(45) Date of Patent: Dec. 24, 2024

(54) SMART CACHE IMPLEMENTATION FOR IMAGE WARPING

(71) Applicant: XILINX, INC., San Jose, CA (US)

(72) Inventors: Sandip Kothari, Hyderabad (IN); Vivek Veenam, Hyderabad (IN); Adhipathi Reddy Aleti, Hyderabad (IN); Jagadeesh Banisetti, Hyderabad (IN)

(73) Assignee: XILINX, INC., San Jose, CA (US)

( * ) Notice: Subject to any disclaimer, the term of this patent is extended or adjusted under 35 U.S.C. 154(b) by 473 days.

(21) Appl. No.: 17/200,107

(22) Filed: Mar. 12, 2021

(51) Int. Cl.
*G06K 9/00* (2022.01)
*G06T 1/60* (2006.01)
(Continued)

(52) U.S. Cl.
CPC ............... *G06T 3/18* (2024.01); *G06T 1/60* (2013.01); *G06T 7/11* (2017.01); *G06T 2207/20021* (2013.01)

(58) Field of Classification Search
CPC ... G06T 2207/20021; G06T 5/00; G06T 7/00; G06T 2207/00; G06T 2210/00; G06T 2211/00; H04L 1/0078; H04L 1/248; H04L 1/00; H04L 19/00; G06F 3/00; G06F 5/00; G06F 7/00; G06F 11/08; G06F 11/14;
(Continued)

(56) References Cited

U.S. PATENT DOCUMENTS 5,175,808 A * 12/1992 Sayre .................. G06T 17/20
345/647
8,594,186 B1 * 11/2013 Denolf ................. H04N 19/105
375/240.03
(Continued)

FOREIGN PATENT DOCUMENTS

JP     2005518584 A *  4/2005  ........... G06K 9/6232
WO    WO-2004075120 A2 *  9/2004  ............. G06T 1/60
WO    WO-2020150264 A1 *  7/2020  ........... G06K 9/6232

OTHER PUBLICATIONS

Choi, Y. J., & Ryoo, J. R. (2016). Image Cache for FPGA-based real-time image warping. Journal of the Institute of Electronics and Information Engineers, 53(6), 91-100. (Year: 2016).*

(Continued)

*Primary Examiner* — Gregory A Morse
*Assistant Examiner* — Kevin M Coomber
(74) *Attorney, Agent, or Firm* — Patterson + Sheridan, LLP

(57) ABSTRACT

A smart cache implementation for image warping is provided by dividing an output image into a plurality of blocks corresponding to initial coordinates in the output image; dividing an input image into at least a first and second regions of pixels, where the first region overlaps the second region; generating an unsorted remap vector of the plurality of blocks for image warping the input image; identifying a first and second subsets of blocks from the plurality of blocks that can be reconstructed using the first and second regions respectively; generating a region-based sorting, a
(Continued)

line-based sorting of the region-based sorting, a column-based sorting of the line-based sorting based on the initial x-coordinates of the blocks in the unsorted remap vector, and a sorted remap vector by sorting the column-based sorting based on initial y-coordinates of the blocks in the unsorted remap vector.

17 Claims, 9 Drawing Sheets

(51) Int. Cl.
*G06T 3/18* (2024.01)
*G06T 7/11* (2017.01)

(58) Field of Classification Search
CPC ...... G06F 12/00; G06F 17/40; G06F 2201/00; G06F 2207/00; G06F 2213/00; G06F 11/00; G06F 2212/00; H04N 1/00; H04N 19/00; H04N 2201/00; H04B 1/00; H04B 2210/00; G03B 23/00
See application file for complete search history.

(56) References Cited

U.S. PATENT DOCUMENTS

| | | | |
|---|---|---|---|
| 8,718,399 B1 | 5/2014 | Reader et al. | |
| 9,536,287 B1* | 1/2017 | Eldar | G06T 3/4007 |
| 2005/0012752 A1* | 1/2005 | Karlov | G09G 5/393 345/538 |
| 2005/0083337 A1* | 4/2005 | Jaspers | G09G 5/393 345/531 |
| 2016/0105630 A1* | 4/2016 | Schaffer | H04N 5/765 348/231.99 |
| 2017/0206689 A1* | 7/2017 | Eo | G06T 3/4007 |
| 2017/0256025 A1* | 9/2017 | Abraham | H04N 19/426 |
| 2018/0350036 A1* | 12/2018 | VanReenen | H04N 1/3935 |
| 2021/0042890 A1* | 2/2021 | Naidu | G06T 1/60 |
| 2021/0090220 A1* | 3/2021 | Manchi | G06T 3/0093 |
| 2021/0209722 A1* | 7/2021 | Nandan | G06F 9/5027 |
| 2021/0209737 A1* | 7/2021 | Hua | G06T 11/40 |

OTHER PUBLICATIONS

Choi, Y. J., & Ryoo, J. R. (2016). Image Cache for FPGA-based real-time image warping. Journal of the Institute of Electronics and Information Engineers, 53(6), 91-100. (Year: 2016) (Year: 2016).*
Gribbon, K.T., et al., "A real-time FPGA implementation of a barrel distortion correction algorithm with bilinear interpolation", Proceedings of the Image and Vision Computing New Zealand Conference 2003, Massey University, pp. 408-413, Nov. 2003.
Ngo, H., et al., "Developing a FPGA-Based High Performance, Power-Aware Architecture for the Correction of Radial Lens Distortion in Video Stream," ICGST Intl. J. on Programmable Devices, Circuits and Systems, PDCS, vol. 7, Issue 1, May 2007, pp. 33-41.
Oh, S., et al., "FPGA-based Fast Image Warping with Data-parallelization Schemes," IEEE Trans. Consumer Electron., vol. 54, No. 4, pp. 2053-2059, Nov. 2008.
Serguienko, A., "Evaluation of Image Warping Algorithms for Implementation in FPGA", Master thesis, Department of Electrical Engineering, Linkopings universitet, Sweden, 2008.
Blasinski, H., et al., "Fpga Architecture for Real-Time Barrel Distortion Correction of Colour Images," IEEE International Conference on Multimedia and Expo, ICME, Jul. 2011, pp. 1-6.
Choi, Y.J., "Image Cache for FPGA-based Real-time Image Warping," Journal of the Institute of Electronics and Information Engineers, vol. 53, No. 6, Jun. 2016.

* cited by examiner

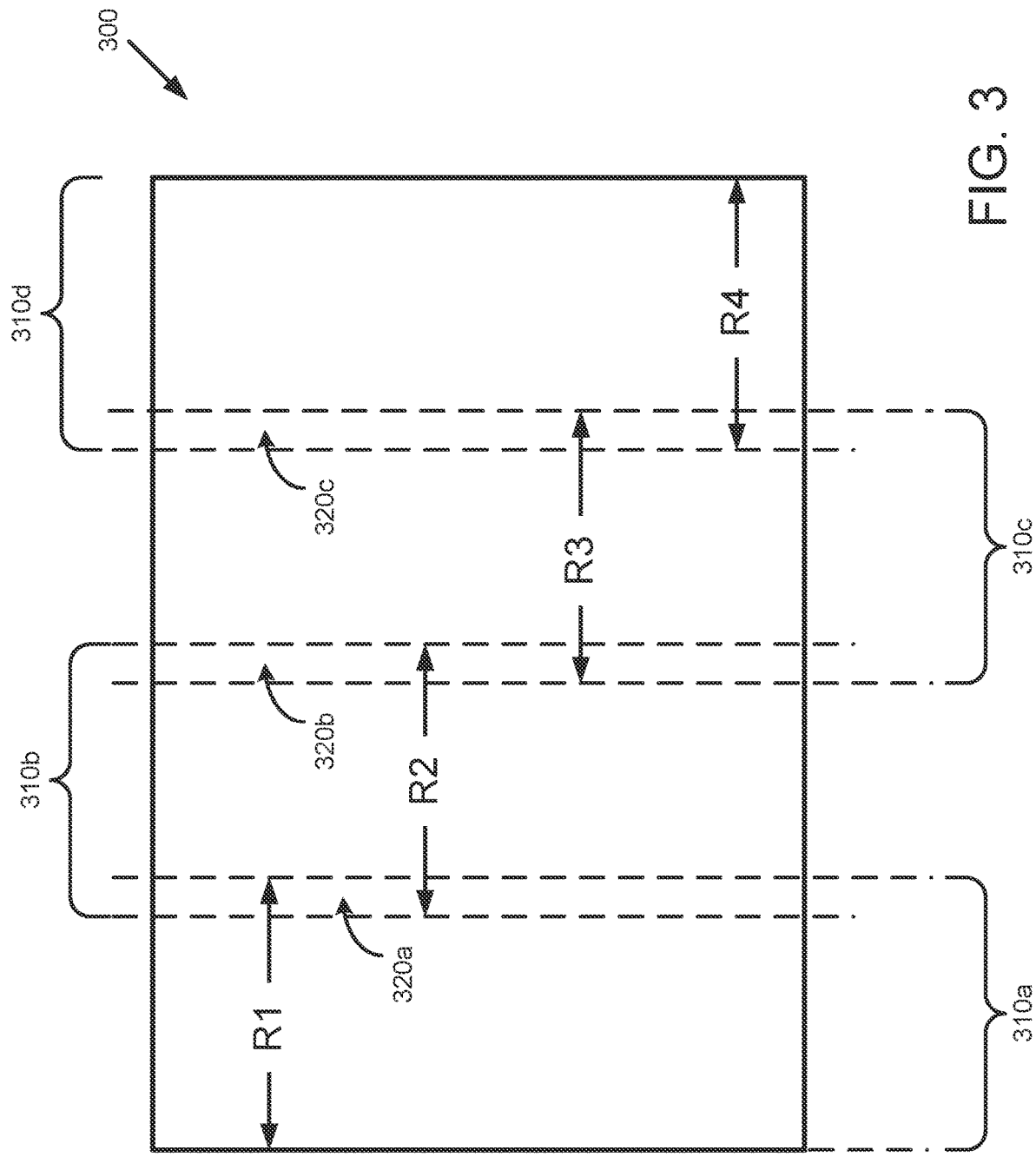

SMART CACHE IMPLEMENTATION FOR IMAGE WARPING

TECHNICAL FIELD

Examples of the present disclosure generally relate to memory cache management for image manipulation.

BACKGROUND

Image warping is a process to correct or counteract various image distortions, such as keystone (where opposing sides of an image have different magnifications), pincushion (a lens distortion where image magnification increases with distance from the optical axis), barrel (a lens distortion where image magnification decreases with distance from the optical axis), and other distortion types. In various embodiments, image warping produces an undistorted output image from a distorted input image, or produces an counter-distorted image that when output by a display device that distorts the image (e.g., to counteract distortions imparted by a projector with an uneven display surface), results in a user viewing an undistorted imaged.

A remap vector is used to generate the undistorted (or counter-distorted) image from the initial input that includes new pixel positions for the pixels of the input that map to the output image. The remap vector maps which particular set of pixels are required from the input image to generate desired pixel in the output image. Various interpolation techniques are used to construct the output image to address the distortion. These interpolation techniques use the positional and color data from nearby pixels, and the type of distortion being corrected for, to produce an output image that accurately reconstructs the intended output image.

Generally, due to the smaller relative size of on-chip memory and the comparatively huge size of the images being manipulated, a computing system performing image interpolation cannot fetch the entire source image at one time to apply the remap vector. Instead, several fetch operations are performed. These multiple fetch operations are used to read the data for image interpolation, and the read operations performed according to the remap vector can create a processing bottleneck due to the high memory bandwidth used therein. When handling video data (i.e., a stream of several sequential images), this bottleneck can reduce the ability of the computing device to provide image correction support at higher resolution, framerates, or combinations thereof.

SUMMARY

One embodiment described herein is a system that includes an internal cache; and at least one processor. The processor is configured to: divide an output image into a plurality of blocks corresponding to initial x-coordinates and initial y-coordinates in the output image; divide an input image into at least a first region of pixels and a second region of the pixels, where the first region overlaps the second region; generate an unsorted remap vector of the plurality of blocks for image warping the output image; identify a first subset of blocks from the plurality of blocks that can be reconstructed using the first region; identify a second subset of blocks from the plurality of blocks that can be reconstructed using the second region; generate a region-based sorting that sorts the first subset of blocks before the second subset of blocks; generate a line-based sorting of the region-based sorting according to a line number of each block of the plurality of blocks in the output image; generate a column-based sorting of the line-based sorting based on the initial x-coordinates of the blocks in the unsorted remap vector; and generate a sorted remap vector by sorting the column-based sorting based on initial y-coordinates of the blocks in the unsorted remap vector.

One embodiment described herein is a method that includes: dividing an output image, corresponding to an input image, into a plurality of blocks corresponding to initial x-coordinates and initial y-coordinates in the output image; dividing the input image into at least a first region of pixels and a second region of the pixels, where the first region overlaps the second region; generating an unsorted remap vector of the plurality of blocks for image warping the input image; identifying a first subset of blocks from the plurality of blocks that can be reconstructed using the first region; identifying a second subset of blocks from the plurality of blocks that can be reconstructed using the second region; generating a region-based sorting that sorts the first subset of blocks before the second subset of blocks; generating a line-based sorting of the region-based sorting according to a line number of each block of the plurality of blocks in the input image; generating a column-based sorting of the line-based sorting based on the initial x-coordinates of the blocks in the unsorted remap vector; and generating a sorted remap vector by sorting the column-based sorting based on initial y-coordinates of the blocks in the unsorted remap vector.

One embodiment described herein is a method that includes: dividing an output image into a plurality of blocks corresponding to initial coordinates of each block in the output image: dividing an input image into a plurality of regions, where each region of the plurality of regions overlaps at least one other region of the plurality of regions; generating an unsorted remap vector of the plurality of blocks for image warping the input image; generating a smart cache table by: identifying a plurality of subsets of blocks from the plurality of blocks that can be reconstructed by each corresponding region of the plurality of regions; generating a region-based sorting that sorts the plurality of subsets of blocks based on an order of the corresponding region to describe the input image; generating a line-based sorting of the region-based sorting according to a line number of each block of the plurality of blocks in the input image; generating an intermediate sorting of the line-based sorting based on a first coordinate of the initial coordinates of the blocks in the unsorted remap vector; and generating a sorted remap vector from the intermediate sorting based on a second coordinate of the initial coordinates of the blocks in the unsorted remap vector.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

Of particular note, although various examples are given with reference regions divided first into columns and then rows, which are read from top to bottom and from right to left, the techniques may be performed in the regions divided first into rows and then columns, which can be read in any direction.

FIG. 3 illustrates an input image divided into several regions that overlap one another via corresponding overlapping sections between adjacent regions, according to embodiments of the present disclosure.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
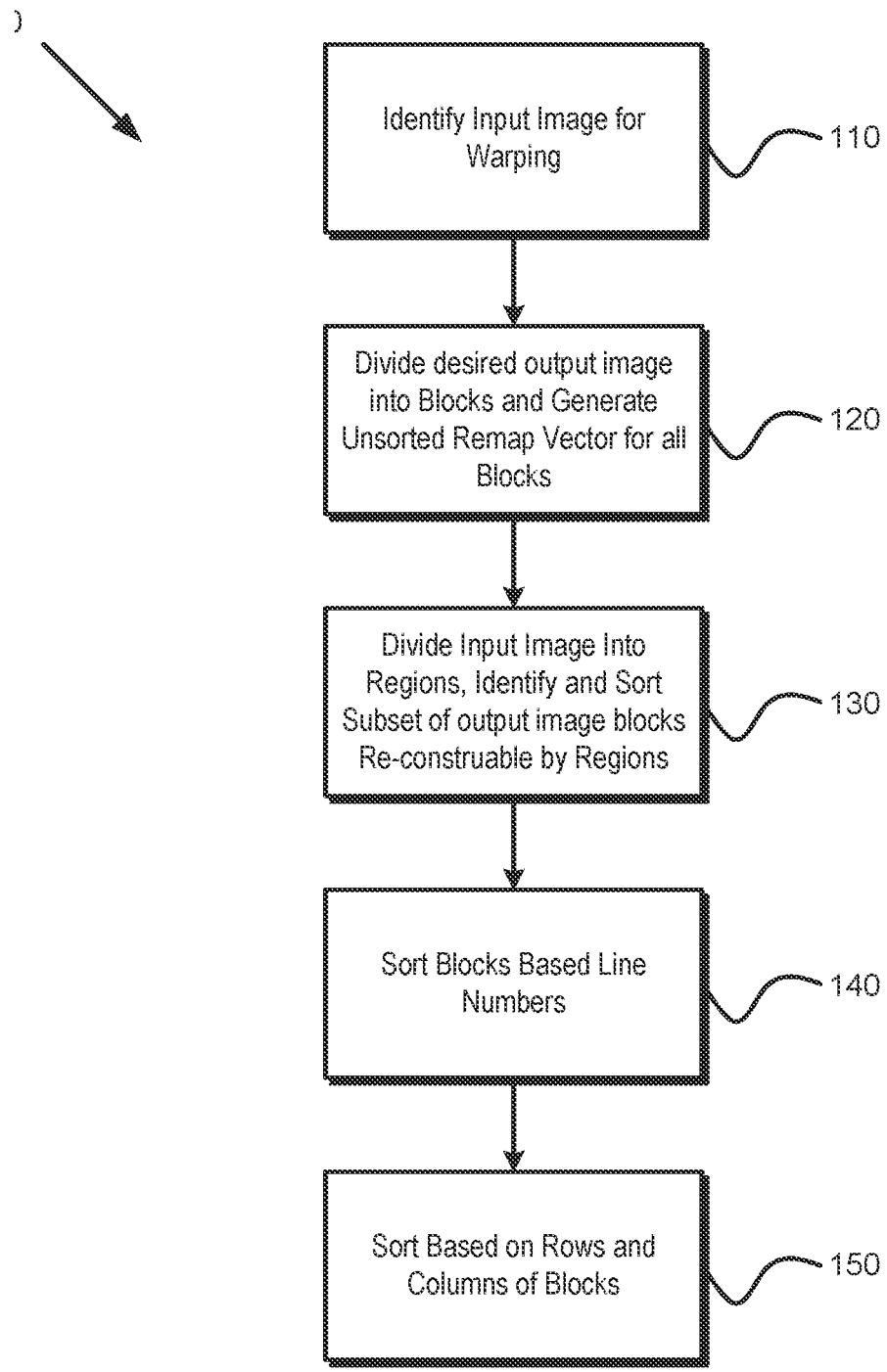
FIG. 1 is a flowchart of a method for generating a smart cache for image warping, according to embodiments of the present disclosure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for image warping and smart cache management for handling data during image warping. By organizing how the image is read into the cache for processing, the present disclosure reduces the read redundancy when processing the image. By reducing read redundancy according to the present disclosure, a processing system can achieve faster processing times to reach higher frames per second (fps) rates bottlenecked by bandwidth or with greater overheads in bandwidth and processing power in achieving a target fps rate not bottlenecked by bandwidth.

FIG. 1 is a flowchart of a method 100 for generating a smart cache for image warping, according to embodiments of the present disclosure. Method 100 begins with block 110, where a processing system identifies an input image for image warping. In various embodiments, the input image may conform to any of several images formats, which may be static images or frames in a video. The input image includes a set of pixels that define various characteristics of the input image (e.g., a red/green/blue (RGB), scRGB, DCI-P3, or other set of chromatic/luminance values) at specific coordinates within the image. In some embodiments, a distortion effect on the input image can affect the values of the various pixels to produce an image that appears stretched, compressed, jumbled, or the like, which detracts from the intended non-distorted output of the image. The present disclosure can be applied to correct image distortions of various types with the same improvements to performance, irrespective of the type of distortion in the image. Method 100 produces a sorted remap vector for use in removing the distortion effect for the input imaged, which is applied in method 600 (discussed in greater detail in regard to FIG. 6).

At block 120, the processing system divides the desired output image into blocks, such as is shown in FIG. 2.

Figure 2A:
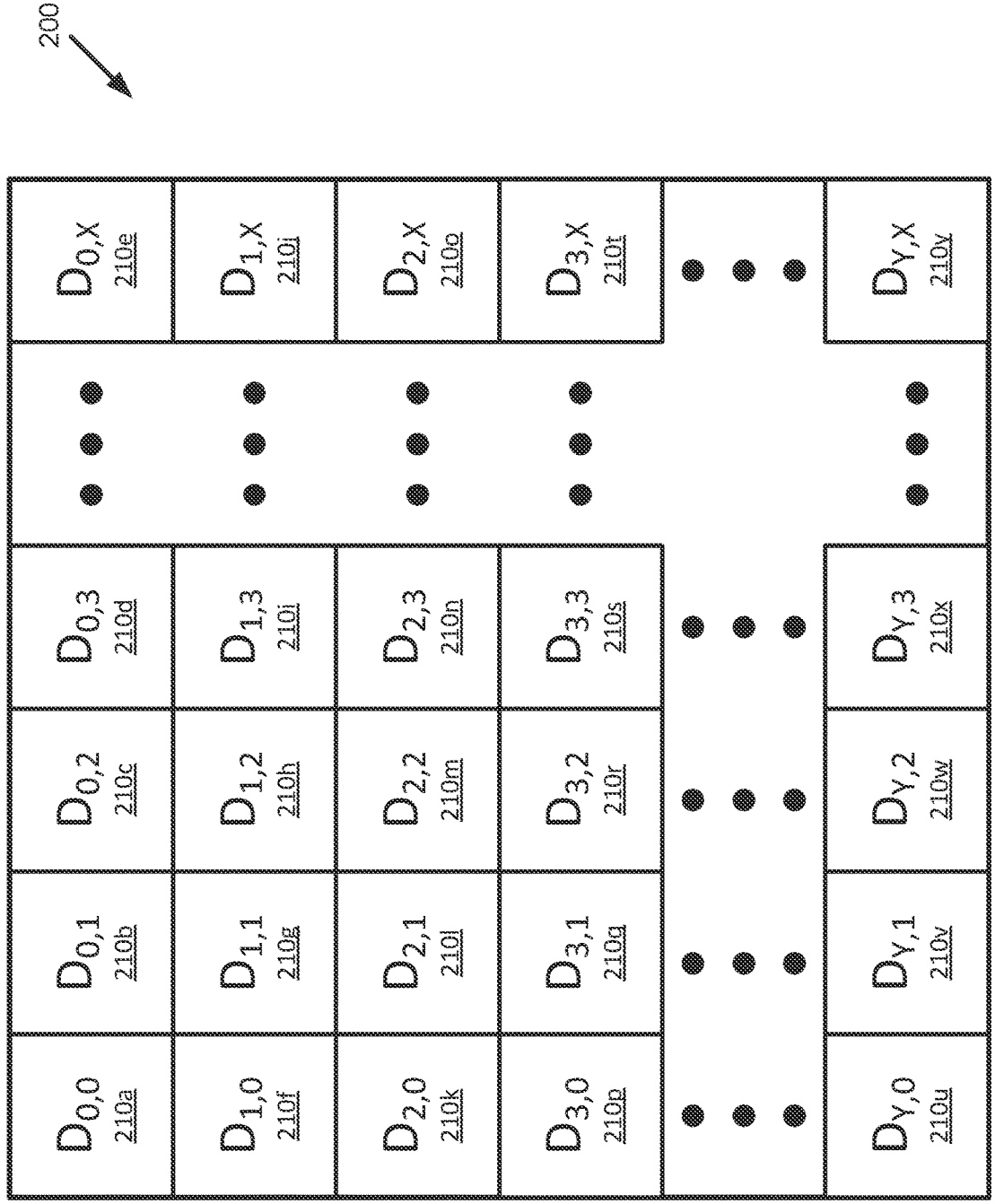
FIG. 2A illustrates an output image divided into a plurality of blocks that describe a set of pixels at specific coordinates in the output image, according to embodiments of the present disclosure

As shown in FIG. 2A, an image 200 is divided into a plurality of blocks 210a-210y (generally or collectively, blocks 210) that include a set of pixels at specific coordinates in the image 200, according to embodiments of the present disclosure. For example, each block 210 can represent a 16×16 set of pixels from the image 200 (i.e., a square region of 256 pixels), although other numbers of pixels can be included in other examples of blocks 210. In this embodiment, the number of pixels included in each block 210 of the image 200 is the same across the image 200, and the block size is determined based on the size of the internal cache of the processing system. Stated differently, the number of lines that the cache can hold determines the size of the blocks 210 so that the cache can create at least one block 210 at a time. For example, if the size of the block 210 is 16×16 pixels, and to create the block 210 requires 64 lines of 1024 pixels each from an input image, and if each pixel is 5 bytes (12 bits per R/G/B value) than the image processing system requires 320 kB (kilobytes) of cache memory (64×1024×5≈320 kB). Larger sizes of blocks 210 and/or higher levels of distortion require more cache memory, therefore, based on cache availability, the image processing system can optimize the size of the blocks 210.

Each block 210 represents a set of pixels from the desired output image 200, and is arranged in the image 200 at a distinct set of horizontal and vertical coordinates. For example, a first block 210a is located at an x-coordinate of 0, and a y-coordinate of 0 and may be identified as $D_{0,0}$ whereas a second block 210b is located at an x-coordinate of 1 and a y-coordinate of 0 and may be identified as $D_{0,1}$, while a sixth block 210f is located at an x-coordinate of 0 and a y-coordinate of 1 and may be identified as $D_{1,0}$. The illustrated example in FIG. 2 sequentially assigns coordinates in a read direction from left-to-right and top-to-bottom such that an initial block $D_{0,0}$ is located in the top left portion of the image 200 and a final block $D_{y,x}$ is located at the bottom right portion of the image 200. As will be appreciated, other processing orders are possible that sequentially assign coordinates to the blocks 210 in other orders, which are compatible with the present disclosure.

Once the desired output image has been divided into blocks, method 100 continues at block 120 where the processing system generates an unsorted remap vector for the image. The processing system generates the remap vector used for image warping based on the distortion in the image. In one embodiment, the processing system generates the remap vector block-by-block for each of the blocks that the image has been divided into (per block 120) in the processing direction specified. Using image 200 from FIG. 2 as an example in a left-to-right and top-to-bottom read direction, the processing system generates the remap vector starting at the first block 210a ($D_{0,0}$) and proceeds horizontally to the fifth block 210e ($D_{0,x}$), then moves to the next line with the sixth block 210f ($D_{1,0}$) and proceeds horizontally to the tenth block 210j ($D_{1,x}$), etc., until reaching the final block 210y ($D_{Y,x}$).

Figure 2B:
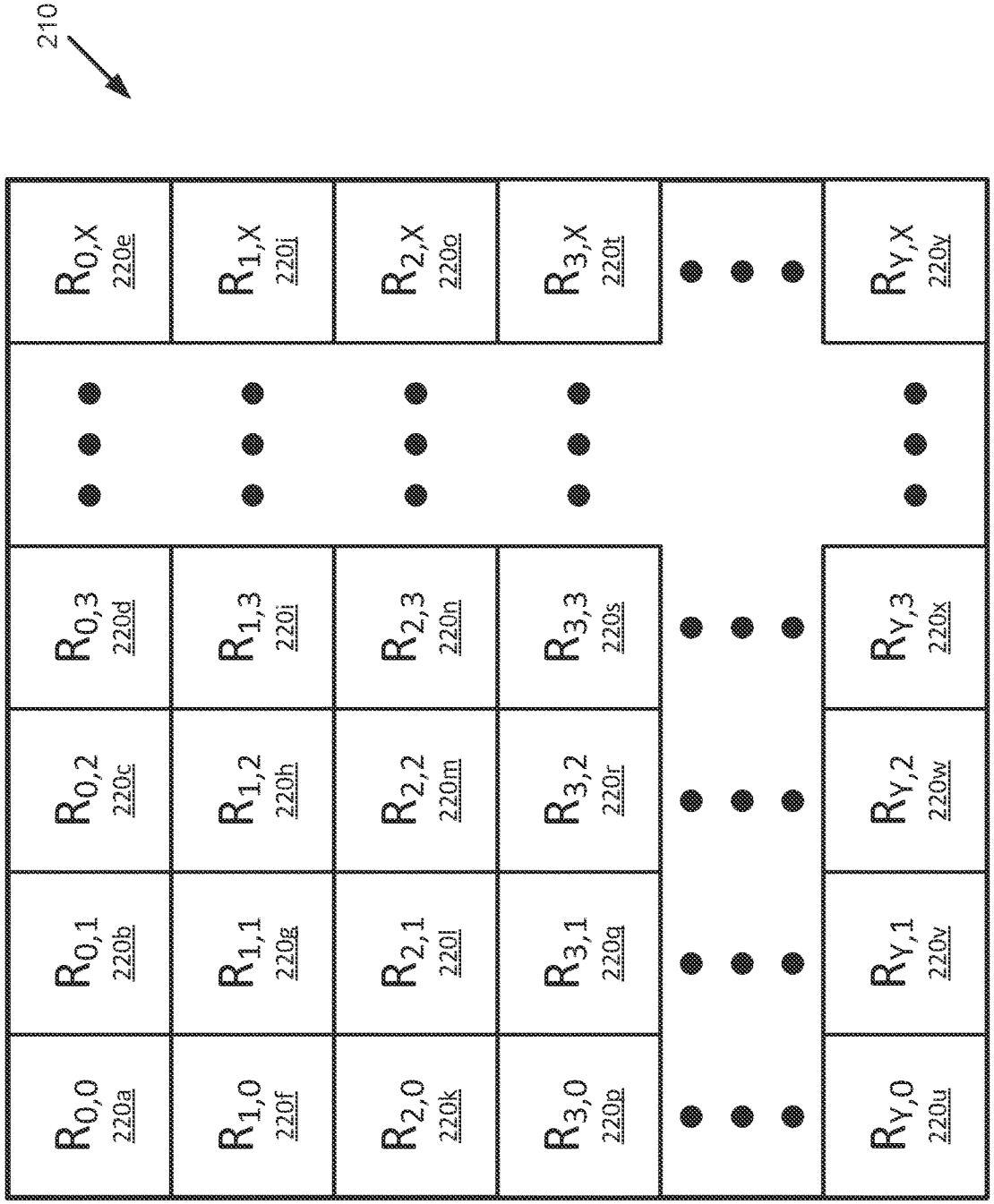
FIG. 2B illustrates the corresponding unsorted remap vectors for each block illustrated in FIG. 2A, according to embodiments of the present disclosure.

In FIG. 2B, the processing system calculates the highest line number of the pixels used for remapping each individual block 210 (from FIG. 2A), and stores the line number along with the initial coordinates of the associated block 210 in the image 200. This storage class is indicated as an associated unsorted remap vector. For example, the system notes that a block Du begins at initial y-coordinate i, initial x-coordinate/in the desired output image. Each block 220 stores an a-coordinate and a b-coordinate. The a-coordinate refers the maximum row number pixel required from the source image to recreate the associated block 210. The b-coordinate refers the maximum column number pixel required from the source image to recreate the associated block 210. The collective line numbers and initial coordinates for the plurality of blocks provides an unsorted remap vector, which the processing system sorts according to four dimensions to produce a sorted remap vector for how to read data into internal cache intelligently to reduce read redundancy (i.e., a "smart" cache table).

Once the input image has been divided into blocks and the unsorted remap vector is generated, method 100 proceeds to block 130, where the processing system divides the input image into a plurality of regions, where each region of the plurality of regions may overlap on other regions of the plurality of regions, such as is shown in FIG. 3.

As shown in FIG. 3, an input image 300 (e.g., the distorted image from which a corresponding output image will be generated from) is divided into several regions 310a-d (generally or collectively, regions 310) that overlap one another via corresponding overlapping sections 320a-c (generally or collectively, overlapping sections 320) between adjacent regions 310, according to embodiments of the present disclosure. For example, a first region 310a overlaps a second region 310b in a first overlapping section 320a, and the second region 310b also overlaps the third region 310c in a second overlapping section 320b. Each region 310 includes a set of pixels, and may have different width and similarly each overlapping section 320 can have a different width. However for simplicity in this example, all of the overlapping sections 320 are shown having the same width. For example in an image 300 that is 3840 pixels wide, three of the four regions 310a-c may describe a column that is 1024 pixels wide, and a fourth region 310d may describe a column that is 960 pixels wide and each of the three overlapping sections 320a-c may describe a column of the 64 pixels shared by the respective adjacent regions 310 to thereby (approximately) evenly and vertically divide the image 300 (e.g., 1024*3 pixels+960 pixels−64*3 pixels=3840 pixels). Each vertical region 310 includes number of lines (i.e., rows) of pixels equal to the height of the image 300. Accordingly, in an image 300 that is 3840×2160 pixels and divided into four vertical regions 310; the regions 310a-c describe 2160 lines of 1024 pixels each and region 310d describes 2160 lines of 960 pixels each.

Although FIG. 3 shows an image 300 divided into four regions 310a-d, in various embodiments, an image 300 may be divided into more or fewer regions 310 with an associated number of overlapping sections 320 between each. Additionally, although the regions 310 shown in FIG. 3 vertically divide the image 300 into columns of pixels, in various embodiments, the regions 310 can be ordered to horizontally divide the image 300 into rows of pixels. Accordingly, any overlapping sections 320 would also describe one or more rows of pixels shared by adjacent regions 310.

Figure 4A:
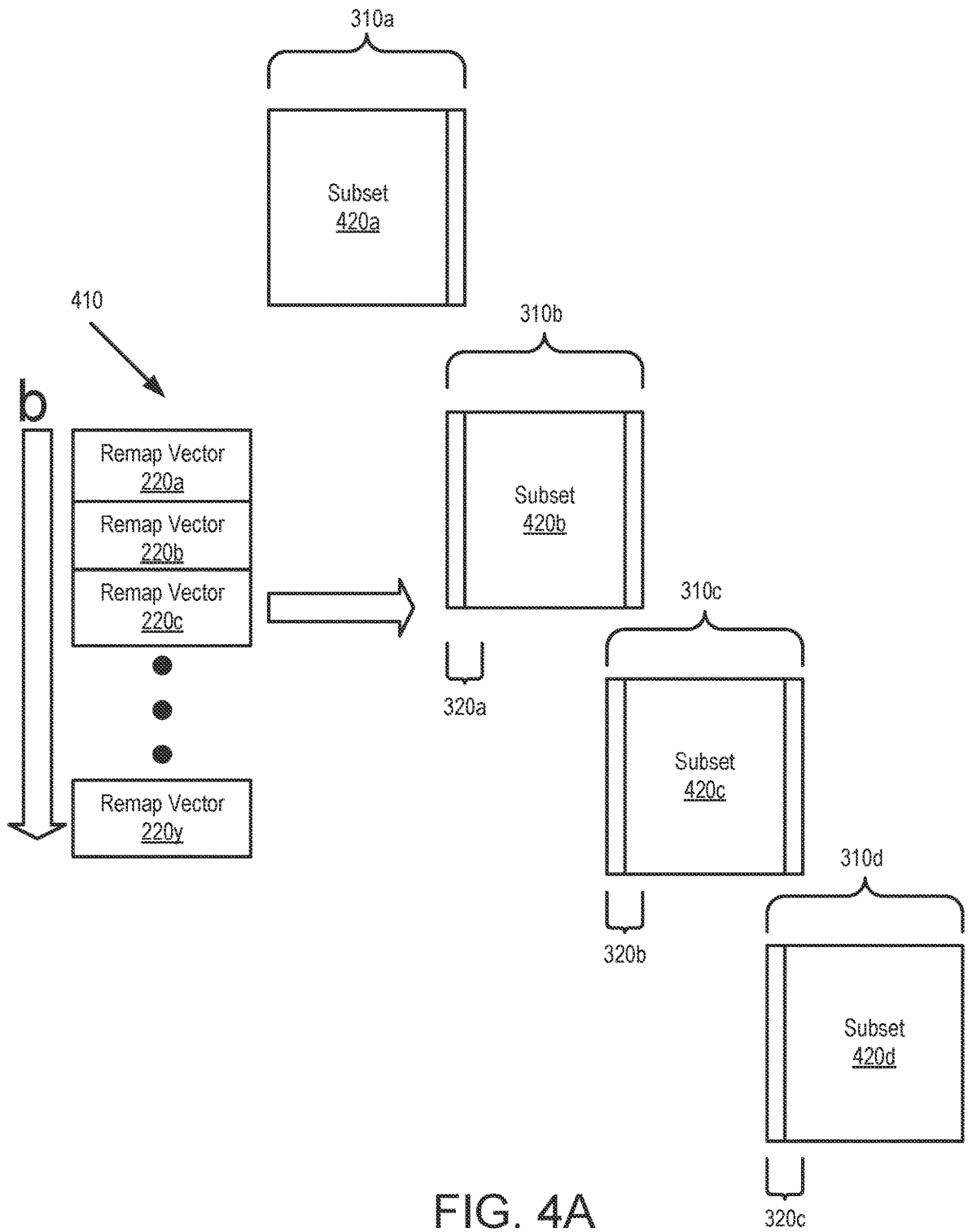
FIG. 4A shows region-based sorting, according to embodiments of the present disclosure.
Figure 4B:
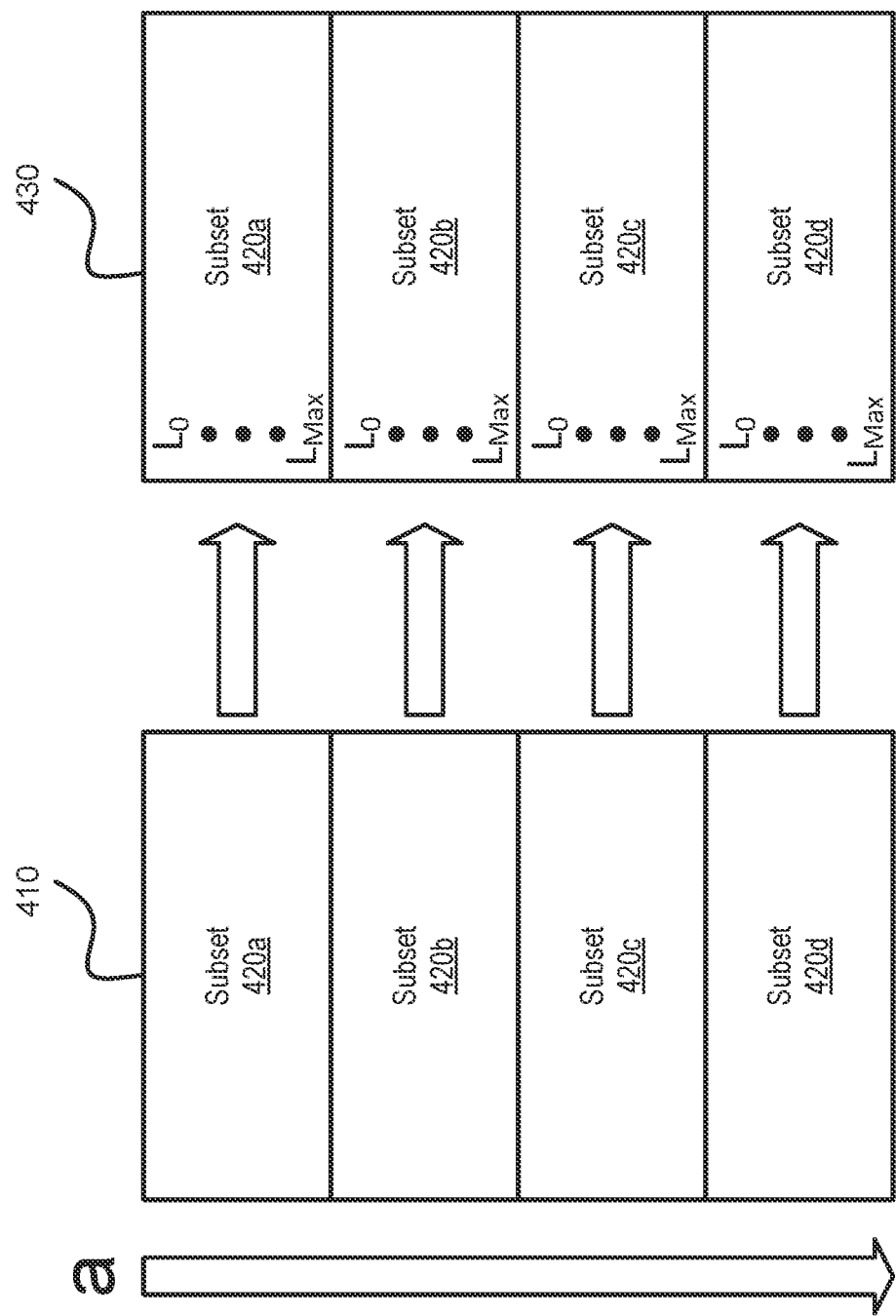
FIG. 4B shows line-based sorting, according to embodiments of the present disclosure.

At block 130 the processing system begins sorting the unsorted remap vector (produced at block 120) based on regions (as a first dimension) and at block 140 sorts based on line numbers (as a second dimension), such as is shown in FIGS. 4A and 4B, which illustrate region-based sorting and line-based sorting, according to embodiments of the present disclosure.

In FIGS. 4A and 4B, the processing system sorts the blocks based on the region that holds the pixels needed for image warping.

FIG. 4A shows the region-based sorting 410 of the blocks 220 (shown in FIG. 2B); sorting a first dimension of the remap vector (based on regions). As shown in FIG. 4A, from blocks 220, the processing system identifies a subset 420a-d (generally or collectively, subset 420) of blocks that can be reconstructed using the pixels in a corresponding region 310a-d. For a 16×16 pixel block, the subsets may be represented as a 64×64 pixel block such that block $D_{i,j}$ can be generated from subset $S_{a,b}$, where a corresponds to an x-coordinate (e.g., between 0 and the width of the image in pixels) and b corresponds to a y-coordinate (e.g., between 0 and the height of the image in pixels) that describes a line in the input image. The overlapping sections 320 are required to make sure that the desired output image block 210 can be created by loading of data into the single cache memory. For example, a tenth block 220j requires 64×64 block $S_{63, 1023}$ from the source image, and an eleventh block 220k requires a 64×64 block $S_{63,1024}$ than 410j will be considered in 420a group and 410k will be considered in group 420b. After this step, the processing system sorts the blocks 220 based on regions 310. For example, the blocks 210 that can be reconstructed using a first region 310a, are sorted before the blocks 210 that can be reconstructed using a second region 310b, which are sorted before the blocks 210 that can be reconstructed using a third region 310c, which are sorted before the blocks 210 that can be reconstructed using a fourth region 310d, etc.

As shown in FIG. 4B, after the region-based sorting 410 is generated, the processing system continues sorting the vector based on the line numbers (i.e., the a-coordinate of the subsets) to arrange the blocks 210 in each region 310 based on the line number used to reconstruct those blocks 210). Accordingly blocks 210 that can be reconstructed using the lines of earlier regions are sorted before the blocks that can be reconstructed using the lines of later regions. The processing system performs a line-based sorting 430 from the region-based sorting 410 so that the blocks 210 that can be reconstructed from each region 310 are ordered to have the blocks 210 with the highest line numbers before blocks 210 with lower line numbers until the minimum line number (e.g., from $L_{max}$ corresponding to the height of the image to $L_0$) is reached, at which point the blocks 210 for the subsequent region 310 are ordered to have the blocks with the highest line numbers before blocks with lower line numbers, etc.

Figure 5:
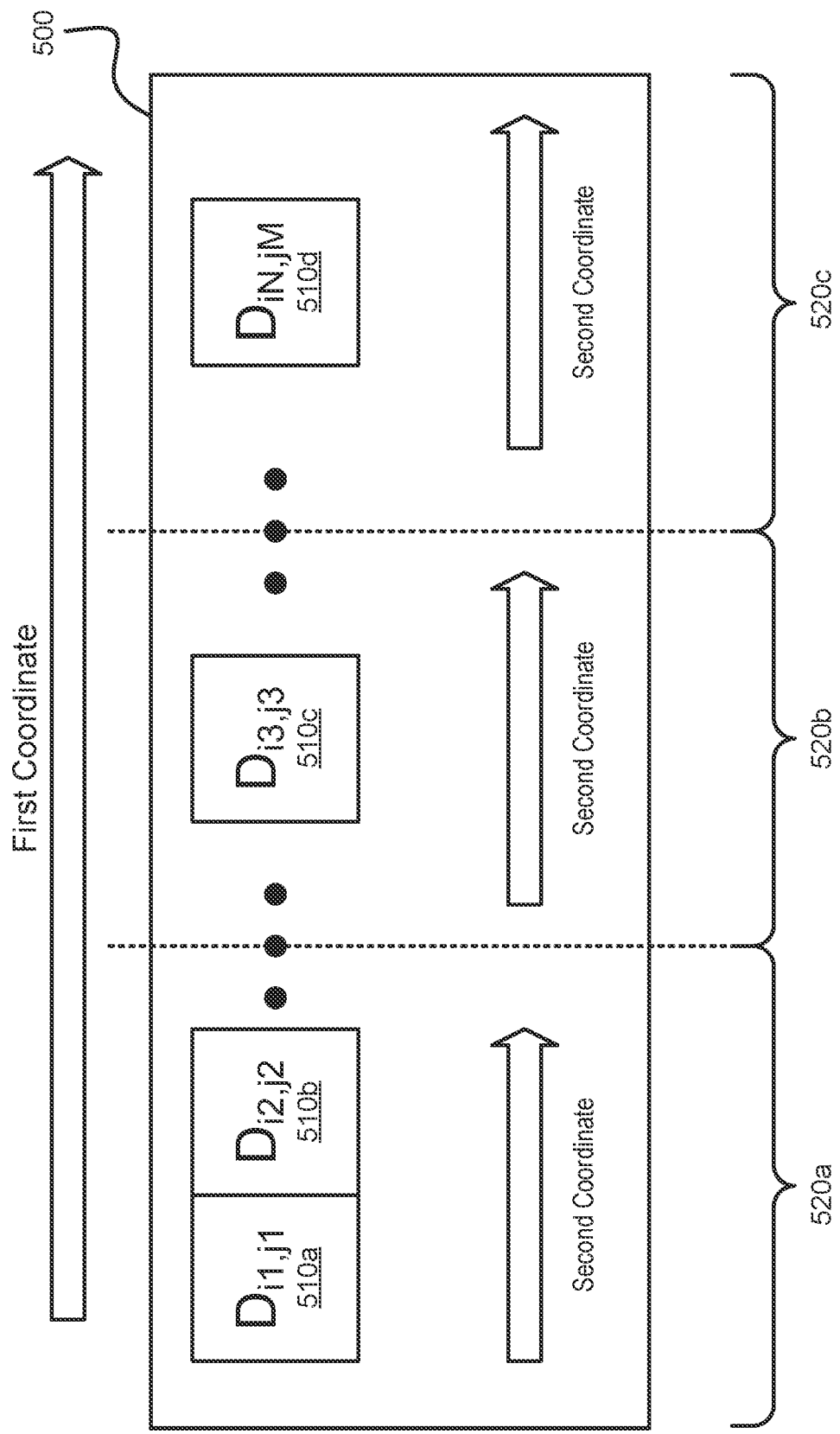
FIG. 5 shows column-based sorting and row-based sorting, according to embodiments of the present disclosure.

At block 150, the processing system generates the sorted remap vector by sorting the blocks based on the initial positions of the blocks in the output image; sorting according to a third dimension (the initial row position of the output image block). As described in relation to FIG. 2A, each block 210 that the image is divided into for image warping is located at a unique position in the output image and the coordinates of that block may be represented as $D_{i,j}$, where i corresponds to the row (or y-coordinate) and corresponds to the column (or x-coordinate) where the block can be found. In various embodiments, the processing system sorts each line from the line-based sorting 430 (e.g., as discussed in relation to FIG. 4B and block 140) first by one of the j-coordinate and the i-coordinate and then by the other of the j-coordinate and the i-coordinate to produce the sorted remap vector for warping the output image. FIG. 5 shows the column-based sorting and row-based sorting performed at block 150 on one such line 500, according to embodiments of the present disclosure.

As shown in FIG. 5, the processing system generates a column-based sorting in the line 500 that orders the blocks 510a-d (generally, or collectively blocks 510) according to the initial x-coordinates of the blocks in the unsorted remap vector; sorting according to a fourth dimension (an initial column position of the output image block). Accordingly, blocks 510 with lower values for the j-coordinate are sorted before blocks 510 with higher values for the j-coordinate. The processing system then orders each collection 520a-c (generally or collectively, collection 520) of blocks 510 sharing a value for a j-coordinate by the i-coordinate so that each set of blocks with a given value for j is then ordered so that blocks with lower values for the i-coordinate are sorted before blocks with higher values for the i-coordinate. For example, the output sorted remap vector will list the blocks 510 according to the processing order (starting with $D_{0,0}$ and ending with $D_{Xmax,Ymax}$).

The example shown in FIG. 5 is based on a left-to-right and top-to-bottom input image read order, but in different input image read orders, the processing system can variously sort the blocks based on the i-coordinate first to produce a row-based sorting that orders the blocks according to the initial y-coordinates of the blocks in the unsorted remap vector. Accordingly, a processing system can produce various intermediate sortings depending on the intended read/write orders to thereby produce a sorted remap vector that lists the blocks according to the associated read order.

Figure 6:
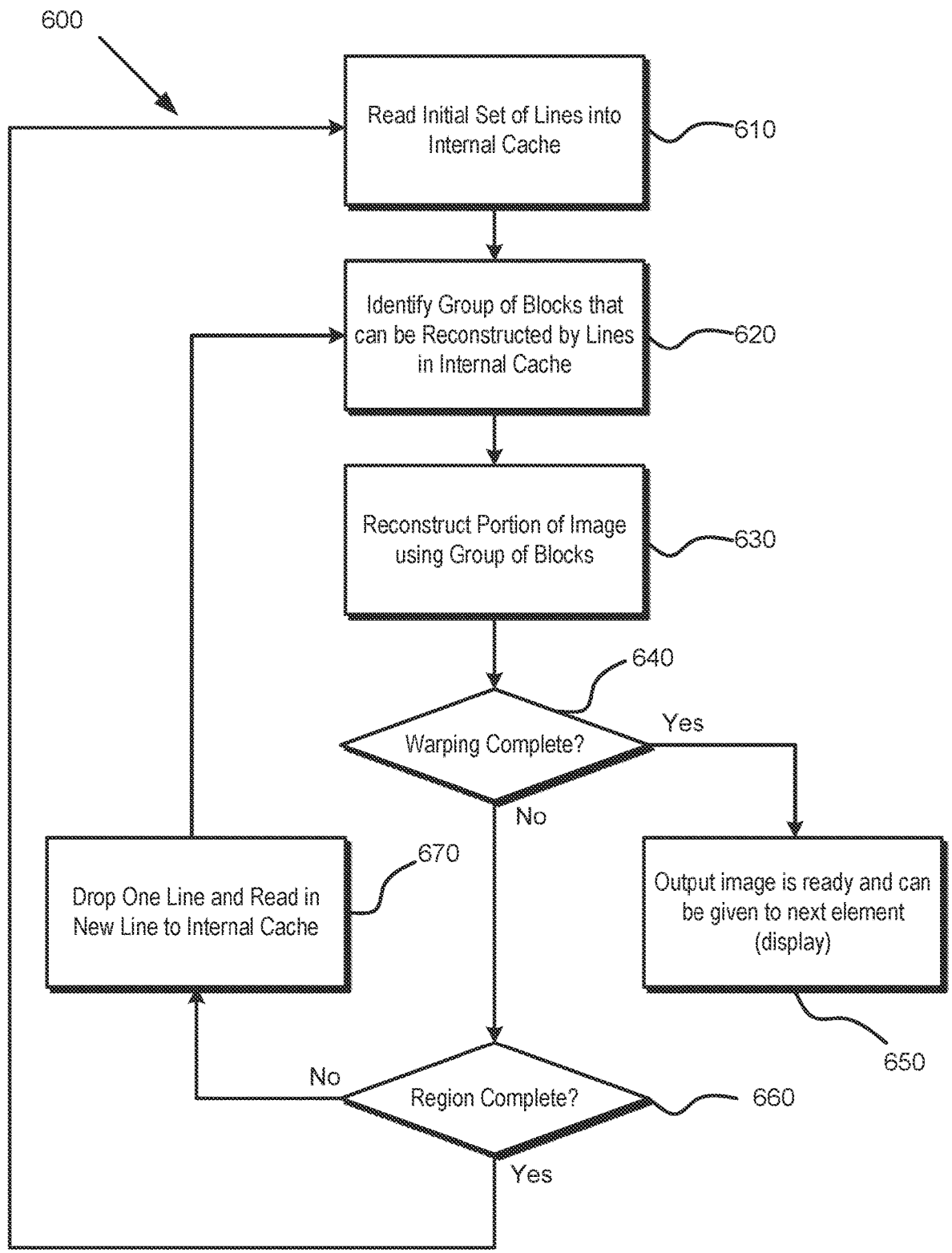
FIG. 6 is a flowchart of a method for deploying a smart cache to perform image warping on a distorted image, according to embodiments of the present disclosure.

FIG. 6 is a flowchart of a method 600 for deploying a smart cache to perform image warping on a distorted image, according to embodiments of the present disclosure. The method 600 assumes that a sorted remap vector has been generated using, for example, the method 100 in FIG. 1. Method 600 begins with block 610, where the processing system reads an initial set of lines of pixel data of an input image into the internal cache for image warping. In one embodiment, these initial lines are drawn from the beginning of one of the regions that the image was divided into (e.g., initially drawn from the first region 310a from FIG. 3 as per block 120 from method 100 as described in relation to FIG. 1), and as such includes a subset of the total input image that is less than or equal to the size of the internal cache that are read in region-by-region. For example, when using a cache size of 320 KB, the cache can store 64 lines of 1024 pixels where each pixel is represented by 36 bits (e.g., 12 bits per R/G/B value), and the processing system therefore reads lines 0 through 63 from the first region into the internal cache. The processing system reads blocks from the regions in the order set according to the sorted remap vector generated using the method 100 (e.g., first from a first region 310a, then from a second region 310b after the first region 310a has been completely read, etc.).

At block 620 the processing system identifies a group of blocks that can be reconstructed (i.e., image warped to a less-distorted state) by the lines currently included in the internal cache. The sorted remap vector identifies which blocks can be reconstructed with the highest line loaded from the current region.

At block 630 the processing system reconstructs a portion of the image using the group of blocks identified per block 620. The processing system may use various image warping techniques to reconstruct the portion of the image to remove a distortion effect present the input image.

At block 640 the processing system determines whether image warping is complete. When all of the lines for the image have been read and the associated blocks processed to produce the reconstructed portions to completely describe a fully reconstructed image, method 600 proceeds to block 650, where the processing system outputs the reconstructed image to the next element in the system, which can be a display engine. Otherwise, when warping is not complete, method 600 proceeds to block 660.

At block 660 the processing system determines whether the lines from the current region have been completely read into the internal cache or additional lines from the region have not been read into the cache yet. When the region has not been completely read into the internal cache, method 600 proceeds to block 670. Otherwise, when the region has been completely read into the internal cache, method 600 returns to block 610 to read in an initial set of lines from the next region. For example, once the first region 310a has been completely read and the block reconstructed therefrom, method 600 returns to block 610 for the processing system to read in an initial set of lines from the second region 310b.

At block 670, when additional lines are available in the current region that have not yet been read into the internal cache, the processing system drops (or evicts) one line from the internal cache and reads the next line from the current region into the internal cache. In various embodiments, the processing system shifts the current lines to drop the lowest line and add the next line to the internal cache, while in other embodiments, the processing system replaces the lowest line with the next line. For example, when the internal cache includes line 0 through line 63 of region N, the processing system removes line 0 and adds line 64 from region N. After the processing system updates the set of lines in the internal cache, method 600 returns to block 620 to reconstruct the group of blocks that can be processed using the new set of lines.

Accordingly, by developing the sorted remap vector (as per method 100 in FIG. 1) and processing input images via the sorted remap vector (as per method 600 in FIG. 6), the processing system performs image warping with reduced read redundancy. The overlapping sections 320 are the only portions of the input image that the processing system reads more than once. Accordingly, instead of needing to make sixteen read operations per pixel being imaged warped, resulting in a 16× read redundancy, the processing system using a smart cache has a read redundancy closer to 1× and thereby save considerable processing power and bandwidth within a computing device. As used herein, the processing power refers to the processing power of the cache controller or the DMA controller in the system.

For example, a 4k image with a width of 3840 pixels and a height of 2160 pixels using 5 bytes per pixel (e.g., 12 bits per RGB component) uses approximately 39.55 MB (Megabytes) of storage space. When read from external memory (e.g., DDR (Double Data Rate) memory at a rate of 60 fps, the bandwidth used for source image read operations into the internal cache for processing is approximately 37.1 GBps (Gigabytes per second), which is beyond the capabilities of many computing systems. Instead, when the input image is divided into four regions 310a-d (e.g., as per FIG. 3) with three overlapping sections 320a-c with widths of 64 pixels, a read redundancy of approximate 1.05× is achieved (e.g.,

[3840+3*64] *2160:3840*2160). In various embodiments, the reduction in read redundancy offered by the present disclosure allows systems with lower bandwidths between external and internal memory devices to achieve higher fps rates than is possible with the 16× read redundancy in conventional image warping. In other embodiments, the reduction in read redundancy offered by the present disclosure allows systems with sufficient bandwidth to achieve a target fps rate to allow the processing system (Cache controller or DMA controller) and bus to idle for several cycles or use these resources for other tasks during those cycles.

Figure 7:
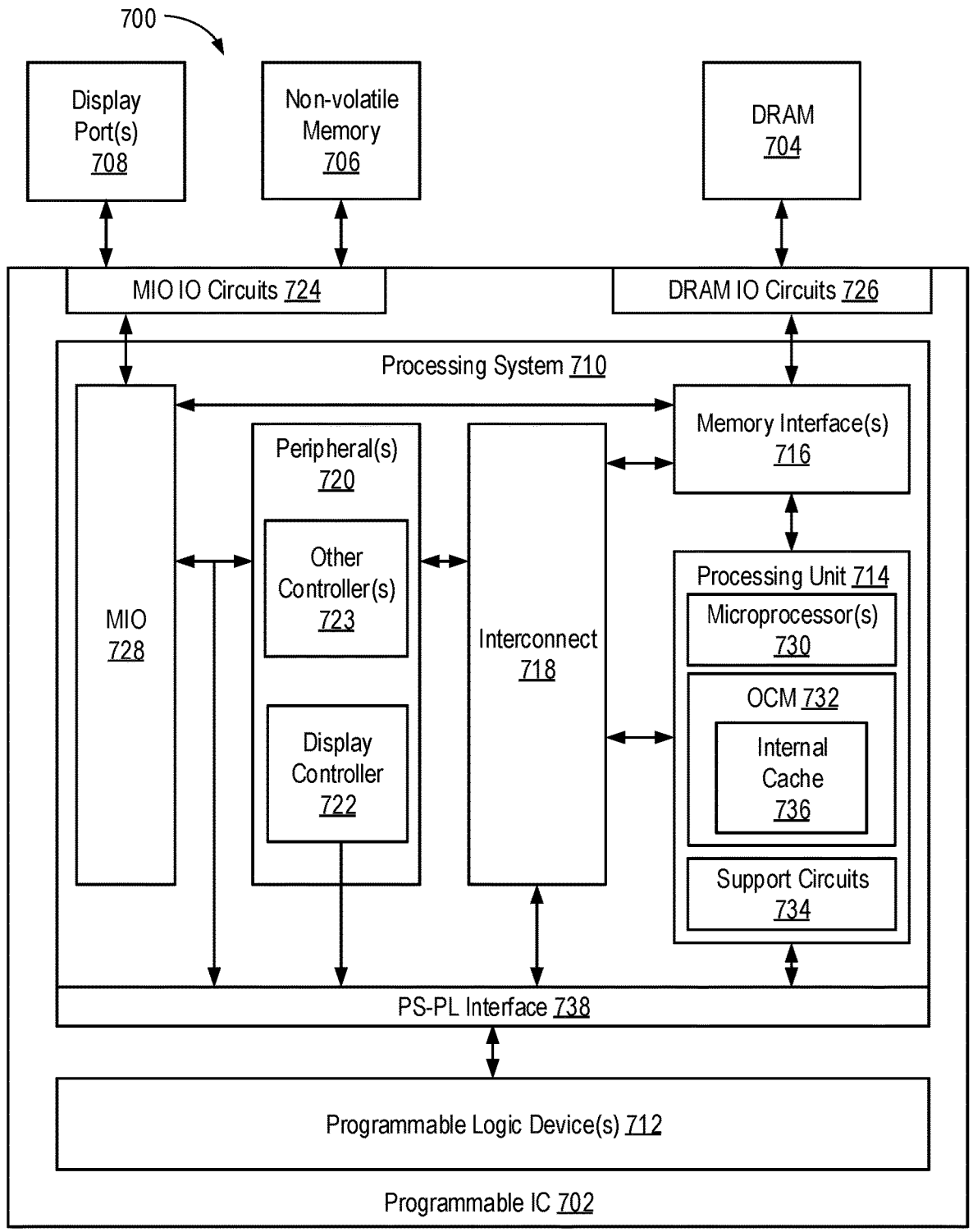
FIG. 7 illustrates a computing device as may be used for image warping according to embodiments of the present disclosure.

FIG. 7 illustrates a computing device 700 as may be used for image warping according to embodiments of the present disclosure. The computing device 700 includes a programmable integrated circuit (IC) 702 coupled to various circuits, such as a dynamic random access memory (DRAM) 704, non-volatile memory 706, and Display Port(s) 708. The DRAM 704 can include various types of volatile memory circuits, such as synchronous DRAM, double data rate synchronous DRAM, and the like that are external to the computing device 700. The non-volatile memory 706 can include various types of non-volatile memory circuits, such as FLASH memory, electrically erasable programmable read only memory (EEPROM), and the like. The display port 708 comprises a circuit that processes display data formatted in accordance with a protocol, such as versions of the DisplayPort protocol, high-definition multimedia interface (HDMI) protocol, versions of the digital visual interface (DVI) protocol, or the like for the display of images on various monitors, televisions, projectors, or other display devices.

The programmable IC 702 can include a processing system 710 and programmable logic device(s) 712. The programmable IC 702 can include a system on chip (SoC) that integrates a microprocessor-based processing system with programmable logic of a field programmable gate array (FPGA), complex programmable logic device (CPLD), or the like. The processing system 710 can be coupled to various input/output (IO) circuits of the programmable IC 702, including multiplexed IO (MIO) circuits 724 and DRAM IO circuits 726. The display ports 708 can be coupled to the MIO IO circuits 724, and the DRAM 704 can be coupled to the DRAM IO circuits 726.

The processing system 710 can include a processing unit 714, one or more memory interfaces (memory interface(s) 716), interconnect 718, one or more peripherals (peripheral(s) 720), an MIO circuit (MIO 728), and a PS-PL interface 738, among other components. The processing unit 714 can be coupled to the memory interface(s) 716. The memory interface(s) 716 can include DRAM memory controllers, non-volatile memory controllers, and the like. The memory interface(s) 716 can be coupled the DRAM IO circuits 726 to communicate with the DRAM 704. The processing unit 714, the memory interface(s) 716, and the peripheral(s) 720 can be coupled to the interconnect 718. The peripheral(s) 720 and the memory interface(s) 716 can also be coupled to the MIO 728, which is in turn coupled to the MIO IO circuits 724. The peripheral(s) 720 can communicate with other circuits through the MIO 728 and the MIO IO circuits 724. The memory interface(s) 716 can communicate with the non-volatile memory 706 through the MIO 728 and the MIO IO circuits 724. The MIO 728 multiplexes interfaces of the peripheral(s) 720 and the memory interface(s) 716 among the MIO IO circuits 724. The peripheral(s) 720, the interconnect 718, and the processing unit 714 can be coupled to the PS-PL interface 738 for communicating with the programmable logic device(s) 712.

The processing unit 714 includes one or more microprocessors (microprocessor(s) 730), on-chip memory (OCM) 732, and support circuits 734. The microprocessor(s) 730 can include any type of microprocessors known in the art. The OCM 732 can include an internal cache 736 (e.g., cache memory, local memory), or the like used to hold portions of an input image for processing and the smart cache vector. The support circuits 734 can include various types of circuits, such as interrupt controller(s), direct memory access (DMA) controllers, timers, registers, interconnect, cache controllers, and the like.

The processing system 710 (PS) is coupled to the programmable logic device(s) 712 (PL) through the PS-PL interface 738. The programmable logic device(s) 712 can communicate with the processing unit 714, the memory interface(s) 716, and the peripheral(s) 720 of the processing system 710. For example, the programmable logic device(s) 712 can interrupt the processing unit 714, access memory through the memory interface(s) 716 or within the processing unit 714, and access IO interfaces of the peripheral(s) 720.

In an example, the peripheral(s) 720 include a display controller 722 and optionally other controller(s) 723. The other controller(s) 723 can include, for example, universal serial bus (USB) controller(s), network controller(s), non-volatile memory controller(s), serial bus controller(s), and the like. The display controller 722 generates display data formatted in accordance with a first protocol. In the present example, the first protocol is a version of the DisplayPort protocol. The display data can include pixel data for displaying image(s) on a display. The display data can also include audio data in combination with the pixel data. The display controller 722 can provide the display data to the Display Ports 708 through the MIO 728 and MIO IO circuits 724.

Throughout the present disclosure, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A system, comprising:
an internal cache; and
at least one processor configured to:
divide an output image into a plurality of blocks corresponding to initial x-coordinates and initial y-coordinates in the output image, each of the plurality of blocks comprising a plurality of pixels;
divide an input image into at least a first region of pixels and a second region of the pixels, wherein the first region overlaps the second region;
generate an unsorted remap vector of the plurality of blocks for image warping the output image;
identify a first subset of blocks from the plurality of blocks that can be reconstructed using the first region;
identify a second subset of blocks from the plurality of blocks that can be reconstructed using the second region;
generate a region-based sorting that sorts the first subset of blocks before the second subset of blocks;
generate a line-based sorting of the region-based sorting according to a line number of each block of the plurality of blocks in the output image;
generate a column-based sorting of the line-based sorting based on the initial x-coordinates of the blocks in the unsorted remap vector, wherein, in the column-based sorting, blocks having the same initial x-coordinate are grouped together; and generate a sorted remap vector by sorting the column-based sorting based on initial y-coordinates of the blocks in the unsorted remap vector.

2. The system of claim 1, wherein the at least one processor is further configured to perform image warping on the input image by:
   reading a first number of lines from the first region into the internal cache;
   identifying, via the sorted remap vector, a first group of blocks of the plurality of blocks than can be reconstructed from an initial line of the lines read into the internal cache;
   reconstructing a first portion of an undistorted image using the first group of blocks;
   replacing an earliest line of the lines in the internal cache with a subsequent line from the first region;
   identifying, via the sorted remap vector, a second group of blocks of the plurality of blocks than can be reconstructed from the subsequent line of the lines read into the internal cache; and
   reconstructing a second portion of the undistorted image using the second group of blocks.

3. The system of claim 2, wherein the at least one processor is further configured to, after having read each line of the first region:
   read the first number of lines from the second region into the internal cache;
   identify, via the sorted remap vector, a third group of blocks of the plurality of blocks than can be reconstructed from a new initial line of the lines read into the internal cache;
   reconstruct a third portion of the undistorted image using the third group of blocks;
   replace a new earliest line of the lines in the internal cache with a new subsequent line from the second region;
   identify, via the sorted remap vector, a fourth group of blocks of the plurality of blocks than can be reconstructed from the new subsequent line of the lines read into the internal cache; and
   reconstruct a fourth portion of the undistorted image using the fourth group of blocks.

4. The system of claim 1, wherein:
   the input image is further divided into a third region of the plurality of blocks, wherein the third region overlaps the second region and does not overlap the first region;
   the at least one processor is further configured to identify a third subset of blocks from the plurality of blocks that can be reconstructed using the third region; and
   the region-based sorting sorts the second subset of blocks before the third subset of blocks.

5. The system of claim 1, wherein each block of the plurality of blocks describes a square area of pixels from the input image.

6. The system of claim 1, wherein the first region includes more blocks than the second region, and wherein a number of blocks included in the first region is based on a cache memory size of the internal cache.

7. A method, comprising:
   dividing an output image, corresponding to an input image, into a plurality of blocks corresponding to initial x-coordinates and initial y-coordinates in the output image, each of the plurality of blocks comprising a plurality of pixels;
   dividing the input image into at least a first region of pixels and a second region of the pixels, wherein the first region overlaps the second region;
   generating an unsorted remap vector of the plurality of blocks for image warping the input image;
   identifying a first subset of blocks from the plurality of blocks that can be reconstructed using the first region;
   identifying a second subset of blocks from the plurality of blocks that can be reconstructed using the second region;
   generating a region-based sorting that sorts the first subset of blocks before the second subset of blocks;
   generating a line-based sorting of the region-based sorting according to a line number of each block of the plurality of blocks in the input output image;
   generating a column-based sorting of the line-based sorting based on the initial x-coordinates of the blocks in the unsorted remap vector, wherein, in the column-based sorting, blocks having the same initial x-coordinate are grouped together; and
   generating a sorted remap vector by sorting the column-based sorting based on initial y-coordinates of the blocks in the unsorted remap vector.

8. The method of claim 7, further comprising, performing image warping on the input image by:
   reading a first number of lines from the first region into an internal cache;
   identifying, via the sorted remap vector, a first group of blocks of the plurality of blocks than can be reconstructed from an initial line of the lines read into the internal cache;
   reconstructing a first portion of an undistorted image using the first group of blocks;
   replacing an earliest line of the lines in the internal cache with a subsequent line from the first region;
   identifying, via the sorted remap vector, a second group of blocks of the plurality of blocks than can be reconstructed from the subsequent line of the lines read into the internal cache; and
   reconstructing a second portion of the undistorted image using the second group of blocks.

9. The method of claim 8, further comprising, after having read each line of the first region:
   reading the first number of lines from the second region into the internal cache;
   identifying, via the sorted remap vector, a third group of blocks of the plurality of blocks than can be reconstructed from a new initial line of the lines read into the internal cache;
   reconstructing a third portion of the undistorted image using the third group of blocks;
   replacing a new earliest line of the lines in the internal cache with a new subsequent line from the second region;
   identifying, via the sorted remap vector, a fourth group of blocks of the plurality of blocks than can be reconstructed from the new subsequent line of the lines read into the internal cache; and
   reconstructing a fourth portion of the undistorted image using the fourth group of blocks.

10. The method of claim 7, wherein: the input image is further divided into a third region of the plurality of blocks, wherein the third region overlaps the second region and does not overlap the first region;
   generating the sorted remap vector further comprises identifying a third subset of blocks from the plurality of blocks that can be reconstructed using the third region; and the region-based sorting sorts the second subset of blocks before the third subset of blocks.

11. The method of claim 7, wherein each block of the plurality of blocks describes an area of 16×16 pixels from the input image.

12. The method of claim 7, wherein the first region includes a different number of blocks than the second region, wherein the number of blocks included in the first region is based on a cache memory size of an internal cache.

13. A method, comprising: dividing an output image, corresponding to an input image, into a plurality of blocks corresponding to initial x-coordinates and initial y-coordinates in the output image, each of the plurality of blocks comprising a plurality of pixels;

dividing the input image into at least a first region of pixels and a second region of the pixels, wherein the first region overlaps the second region; generating an unsorted remap vector of the plurality of blocks for image warping the input image;

identifying a first subset of blocks from the plurality of blocks that can be reconstructed using the first region;

identifying a second subset of blocks from the plurality of blocks that can be reconstructed using the second region;

generating a region-based sorting that sorts the first subset of blocks before the second subset of blocks;

generating a line-based sorting of the region-based sorting according to a line number of each block of the plurality of blocks in the output image;

generating a column-based sorting of the line-based sorting based on the initial x-coordinates of the blocks in the unsorted remap vector, wherein, in the column-based sorting, blocks having the same initial x-coordinate are grouped together; and generating a sorted remap vector by sorting the column-based sorting based on initial y-coordinates of the blocks in the unsorted remap vector.

14. The method of claim 13, further comprising, performing image warping on the input image by:

reading, according to the sorted remap vector, lines of the input image into an internal cache of an image processor;

for each set of lines read into the internal cache:

identifying, via the sorted remap vector, a group of blocks of the plurality of blocks than can be reconstructed from the set of lines;

reconstructing a portion of an undistorted image using the group of blocks; and shifting the lines read into the internal cache with a subsequent line from the image.

15. The method of claim 14, wherein each region of the plurality of regions includes an identical number of blocks, wherein the identical number of blocks is based on a cache memory size of the internal cache.

16. The method of claim 13, wherein the first initial coordinate is a horizontal coordinate and the second initial coordinate is a vertical coordinate, wherein the lines are read horizontally from left to right, and wherein each region of the plurality of regions describes a vertical column in the input image.

17. The method of claim 13, wherein each block of the plurality of blocks describes a square area of pixels from the output image.

* * * * *